United States Patent [19]
Yamanaka

[11] Patent Number: 5,358,590
[45] Date of Patent: Oct. 25, 1994

[54] METHOD OF MANUFACTURING INDIVIDUAL ELEMENT ARRAYS

[75] Inventor: Hideo Yamanaka, Kanagawa, Japan

[73] Assignee: Sony Corporation, Tokyo, Japan

[21] Appl. No.: 43,812

[22] Filed: Apr. 7, 1993

[30] Foreign Application Priority Data

Apr. 8, 1992 [JP] Japan ................... 4-114196

[51] Int. Cl.$^5$ .................. B32B 31/18; B32B 31/28
[52] U.S. Cl. ................... 156/247; 156/257; 156/268; 156/272.8; 156/272.2; 437/226
[58] Field of Search .......... 437/226; 156/257, 268, 156/272.2, 248, 247, 272.8, 344, 584

[56] References Cited

U.S. PATENT DOCUMENTS

| | | | |
|---|---|---|---|
| Re. 32,571 | 1/1988 | Burger | 156/272.8 X |
| 4,270,317 | 1/1988 | Kuroda | 156/268 X |
| 4,473,424 | 9/1989 | Sorko-Ram | 156/272.8 X |

FOREIGN PATENT DOCUMENTS

| | | | |
|---|---|---|---|
| 0035676 | 3/1979 | Japan | 437/226 |
| 0029176 | 3/1980 | Japan | 437/226 |
| 0091138 | 7/1980 | Japan | 437/226 |
| 0035531 | 2/1985 | Japan | 437/226 |
| 405003249 | 1/1993 | Japan | 437/226 |

*Primary Examiner*—David A. Simmons
*Assistant Examiner*—Charles Rainwater
*Attorney, Agent, or Firm*—Hill, Steadman & Simpson

[57] ABSTRACT

A method of manufacturing a plurality of individual element arrays, including the steps of forming a wafer including a substrate and a plurality of elements formed on the substrate; bonding a transparent protective tape to an upper surface of the wafer to protect the wafer; bonding a supporting tape to a lower surface of the wafer to support the wafer; and cutting the transparent protective tape, the wafer and an upper portion of the supporting tape to form the individual element arrays separated from each other. Accordingly, attachment of dust onto the upper surface of the wafer can be surely prevented by the protective tape in cutting the wafer. Further, accurate cutting of the wafer into a desired shape can be ensured owing to the transparency of the protective tape.

15 Claims, 3 Drawing Sheets

F I G. 3(A)
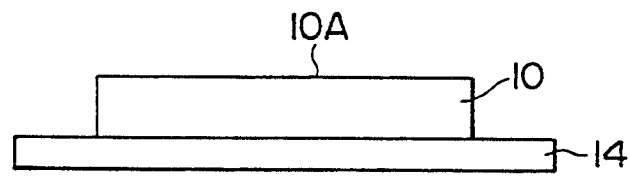
F I G. 3(B)
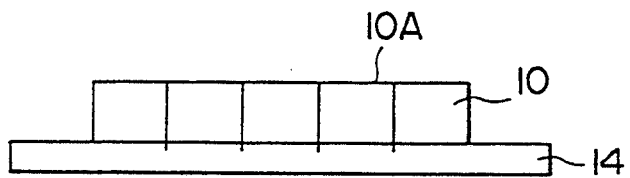
F I G. 3(C)
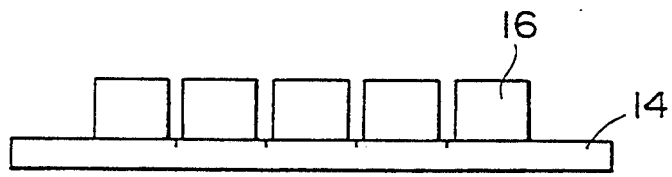

METHOD OF MANUFACTURING INDIVIDUAL ELEMENT ARRAYS

BACKGROUND OF THE INVENTION

1. Field of the Invention

The present invention relates to a method of manufacturing a plurality of individual element arrays such as liquid crystal display element arrays, and also to a manufacturing method for a liquid crystal display device using the above method.

2. Description of the Related Art

Usually, individual arrays each having a semiconductor element, liquid crystal driving element or opposing electrode (which arrays will be hereinafter referred to as element arrays) are manufactured by forming a plurality of semiconductor elements, liquid crystal driving elements or opposing electrodes on a single substrate, and then cutting the substrate into a plurality of individual parts separated from each other. The substrate is usually formed of silicon or glass. In the following description, the substrate on which such plural elements have been formed will be referred to as a wafer.

FIGS. 3A, 3B and 3C show the steps of a wafer cutting method in the related art. As shown in FIG. 3A, a supporting tape 14 is bonded to a lower surface of a wafer 10 to support the wafer 10. The supporting tape 14 has a thermosetting or ultraviolet-setting adhesive layer. Then, as shown in FIG. 3B, the wafer 10 is completely cut in a thickness direction thereof, and the supporting tape 14 is partially cut in a thickness direction thereof, thereby forming a plurality of individual element arrays 16. The cutting of the wafer 10 and the supporting tape 14 is usually performed by using a dicing apparatus. Then, as shown in FIG. 3C, the supporting tape 14 is drawn to separate the individual element arrays 16 from each other.

Further, there is disclosed in Japanese Patent Publication No. 2-23324 another method including the steps of bonding an adhesive tape employing an ultraviolet-setting adhesive layer on an upper surface of a wafer, dicing the wafer, and then irradiating the adhesive tape with ultraviolet rays to harden the ultraviolet-setting adhesive layer.

In the usual wafer cutting method shown in FIGS. 3A to 3C, an upper surface 10A of the wafer 10 is not covered in cutting the wafer 10. Accordingly, dust generated in cutting the wafer 10 inclusive of the substrate such as silicon or glass and the supporting tape 14 is attached to the upper surface 10A of the wafer 10. The dust attached to the upper surface 10A of the wafer 10 cannot be completely removed by a wafer washing process. As a result, there will occur disconnection or short-circuit of wires formed in the elements or a cause of poor bonding. Further, if the dust is attached to an upper surface of a CCD element or a linear sensor, a picture element defect such as a black flaw will be generated at a portion of the upper surface where the dust is attached.

Further, to prevent electrostatic breakdown of the elements in cutting the wafer, $CO_2$ is usually mixed in a pure water to set a specific resistance of the pure water to several $M\Omega$. However, the mixing of $CO_2$ causes acidification of the pure water to result in a short life of a cutting blade of the dicing apparatus. Further, a $CO_2$ generating apparatus is necessary.

In manufacturing liquid crystal driving element arrays or opposing electrode arrays, an orientation film of the element is subjected to a rubbing process. However, in the rubbing process, there is a possibility that the dust attached to the upper surface of the liquid crystal driving element or the opposing electrode will flaw a thin film transistor (TFT) portion and a picture element display portion of the liquid crystal driving element or the opposing electrode. Further, wires of the element will also be marred or broken. As a result, an yield and a quality of the liquid crystal display device are reduced.

On the other hand, in the dicing method disclosed in Japanese Patent Publication No. 2-23324, the above problem due to the dust generating in cutting the wafer can be solved because the upper surface of the wafer is covered with the adhesive tape. However, as is apparent from FIG. 4 in Japanese Patent Publication No. 2-23324, the adhesive tape is peeled from the wafer after cutting the wafer, and the wafer is then divided into a plurality of individual semiconductor element arrays. However, dust is generated in dividing the wafer to contaminate the upper surfaces of the semiconductor element arrays. Further, there is no description concerning a material of the adhesive tape in the above-cited reference. If the material of the adhesive tape is opaque, a dicing alignment mark formed on the upper surface of the wafer cannot be read through the opaque adhesive tape, so that it is difficult to accurately cut the wafer into a desired shape.

SUMMARY OF THE INVENTION

It is accordingly an object of the present invention to provide a method of manufacturing a plurality of individual element arrays, which can surely prevent that dust will be attached to the upper surface of the wafer when the wafer is cut into the individual element arrays.

It is another object of the present invention to provide a method of manufacturing a plurality of individual element arrays, which can ensure accurate cutting of the wafer into a desired shape.

According to the present invention, there is provided a method of manufacturing a plurality of individual element arrays, comprising the steps of forming a wafer comprising a substrate and a plurality of elements formed on said substrate; bonding a transparent protective tape to an upper surface of said wafer to protect said wafer; bonding a supporting tape to a lower surface of said wafer to support said wafer; and cutting said transparent protective tape, said wafer and an upper portion of said supporting tape to form said individual element arrays separated from each other.

In the manufacturing method of the present invention, the upper surface of the wafer is protected by the transparent protective tape until the wafer is cut into the individual element arrays. Accordingly, the dust generating upon cutting the wafer can be surely prevented from being attached to the wafer. Furthermore, since the protective tape is transparent, the dicing alignment mark formed on the upper surface of the wafer can be surely read, so that the wafer can be accurately cut into a desired shape.

As described above, according to the manufacturing method of the present invention, since the upper surface of the wafer is covered with the protective tape in the cutting step for the wafer, the dust generated upon cutting the substrate and the supporting tape can be prevented from being attached to the upper surface of the wafer, thereby improving a yield of the element arrays and a reliability of the elements. Further, in case of peeling the protective tape from each element array after the cutting step, contaminants possibly remaining on the upper surface of each element array can be removed by the protective tape, thereby further improving the yield of the element arrays and the reliability of the elements. Further, since it is unnecessary to consider the dust upon cutting the wafer, and the wafer is completely cut in a thickness direction thereof, a condition of cutting of the wafer can be relaxed to thereby relax a performance of the dicing apparatus and additionally contribute to a suppression of cleaning work and a reduction in equipment investment for a clean room and a manufacturing apparatus. Further, it is unnecessary to provide a $CO_2$ generating apparatus for preventing the electromagnetic breakdown, which is necessary in the related art method.

In addition, since the protective tape is transparent, the dicing alignment mark formed on the upper surface of the wafer can be surely read, so that the wafer can be accurately cut into a desired shape.

Other objects and features of the invention will be more fully understood from the following detailed description and appended claims when taken with the accompanying drawings.

BRIEF DESCRIPTION OF THE DRAWINGS

FIGS. 3A to 3C are schematic side views illustrating the steps of a wafer cutting method in the related art.

DETAILED DESCRIPTION OF THE PREFERRED EMBODIMENTS

There will now be described a preferred embodiment of the present invention with reference to FIGS. 1A to 1D and 2, in which a plurality of individual element arrays are manufactured by cutting a wafer including a glass substrate and a plurality of liquid crystal driving elements formed on the glass substrate.

First Step

Figure 2:
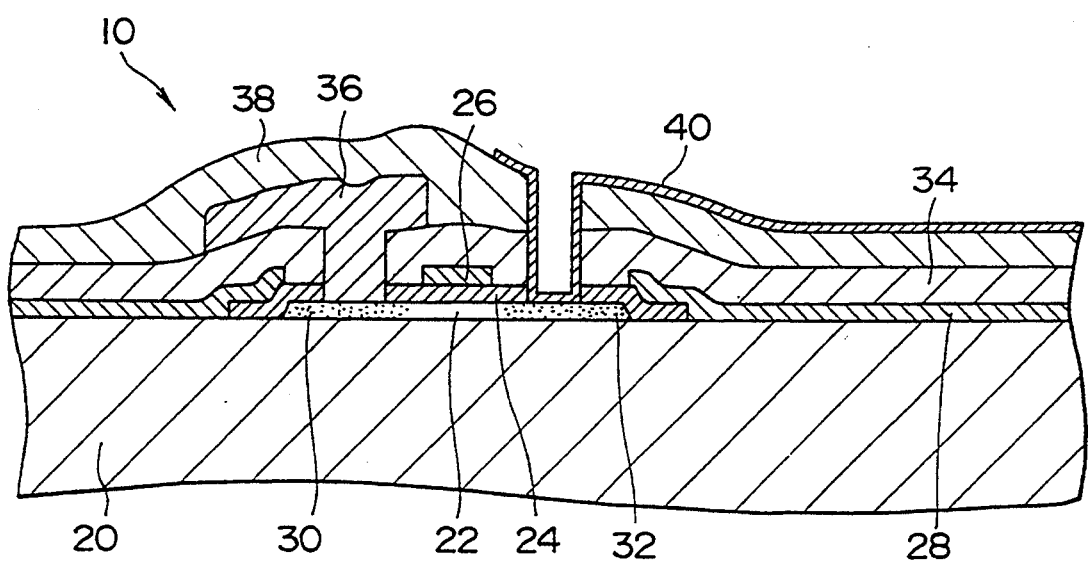
FIG. 2 is a schematic fragmentary sectional view of a liquid crystal driving element.

First, a plurality of liquid crystal driving elements are to be formed on an upper surface of a glass substrate to thereby form a wafer. As shown in FIG. 2, reference numeral 20 designates a substrate formed of glass. A first polysilicon layer 22 having a thickness of about 50 nm is formed on the substrate 20 by a plasma CVD process. A gate oxide film 24 having a thickness of about 50 nm is formed on the first polysilicon layer 22 by a plasma CVD process. A second polysilicon layer having a thickness of about 400 nm is formed on the gate oxide film 24 by a plasma CVD process, and it is then patterned by a conventional process to form a gate electrode region 26.

Then, ion implantation is performed into the first polysilicon layer 22 to form source and drain regions 30 and 32. Then, an $Si_3N_4$ layer 28 as a protective film having a thickness of about 30 nm is formed on the substrate 20 by a plasma CVD process and a patterning process. Then, a first insulating layer 34 of PSG, for example, having a thickness of 500 nm is formed over the upper surface of the substrate 20 by an atmospheric pressure CVD process. Then, an opening is formed through the first insulating layer 34 and the gate oxide film 24 on the source region 30 by a photolithography process and an etching process.

Then, an aluminum film having a thickness of 500 nm is formed in this opening and on the first insulating layer 34 by a sputtering process, for example, and this aluminum film is patterned to form a wiring 36. Further, a dicing alignment mark is formed at a predetermined position. Then, a second insulating layer 38 of PSG, for example, having a thickness of 500 nm is formed over the upper surface of the substrate 20 by an atmospheric pressure CVD process. In this way, a plurality of thin film transistors are formed on the upper surface of the substrate 20. Then, an opening is formed through the second insulating layer 38, the first insulating layer 34 and the gate oxide film 24 on the drain region 32 by a photolithography process and an etching process, and an ITO film 40 having a thickness of 150 nm is formed in this opening and on the second insulating layer 38 by a sputtering process. Then, the ITO film 40 is patterned by a photolithography process and an etching process to form a driving electrode for a liquid crystal display device. In this way, a plurality of liquid crystal driving elements are formed on the glass substrate 20 to prepare a wafer 10.

Second Step

Figure 1A:
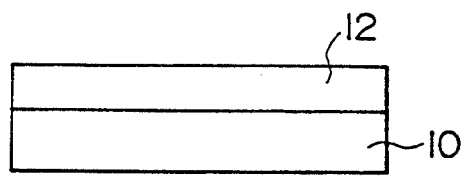
FIGS. 1A to 1D are schematic side views illustrating the steps of a manufacturing method according to the present invention.

As shown In FIG. 1A, a transparent protective tape 12 is bonded to an upper surface of the wafer 10. The protective tape 12 is comprised of a transparent film of polyolefin or PVC and an ultraviolet-setting adhesive layer. It is important that when the protective tape 12 is peeled from the upper surface of the wafer 10 later, the adhesive layer must not be left on the upper surface of the wafer 10. In general, it is desirable that the adhesive layer of the protective tape 12 is harder than an ultraviolet-setting adhesive layer as an example of an adhesive layer of a supporting tape 14 to be hereinafter described because the adhesive layer of the protective tape 12 remains on the upper surface of the wafer 10 when peeled from the upper surface of the wafer 10. In other words, it is desirable that the adhesive layer of the protective tape 12 has a hardness to such a degree that when the protective tape 12 is bonded to the upper surface of the wafer 10, the adhesive layer does not penetrate into a film pattern of elements formed on the substrate 20. Examples of the protective tape 12 may include SP-525M and SP-594M manufactured by Furukawa Denki Kogyo K. K. The protective tape 12 has a thickness of preferably about 40 to 50 $\mu$m.

Third Step

Figure 1B:
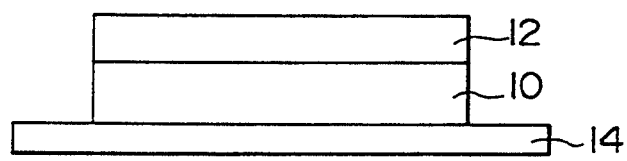

As shown in FIG. 1B, a supporting tape 14 is bonded to a lower surface of the wafer 10. The supporting tape 14 is comprised of a base film and a thermosetting or ultraviolet-setting adhesive layer. Examples of the supporting tape 14 employing a thermosetting adhesive layer may include HAE-1506 manufactured by Hitachi Kasei Kogyo K. K. and VD-8 manufactured by Nitto Denko K. K. Examples of the supporting tape 14 employing an ultraviolet-setting adhesive layer may include UC-3446P manufactured by Furukawa Denki Kogyo K. K. and U-10D manufactured by Nitto Denko K. K. The supporting tape 14 has a thickness of preferably about 80 to 100 $\mu$n.

Fourth Step

Figure 1C:
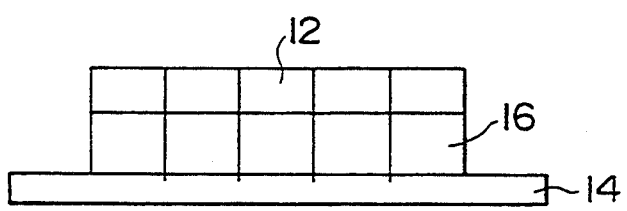

As shown in FIG. 1C, the protective tape 12 and the wafer 10 are completely cut in a thickness direction thereof, and the supporting tape 14 is partially cut in a thickness direction thereof by using a usual dicing apparatus as reading the dicing alignment mark formed on the upper surface of the wafer 10. The supporting tape 14 is cut to a depth of preferably about 20 to 30 μm. Dust generating in cutting the wafer 10 and the supporting tape 14 is attached to an upper surface of the protective tape 12, and it is therefore possible to prevent that the dust will be attached to the upper surface of the wafer 10 covered with the protective tape 12. Furthermore, since the protective tape 12 is formed of a transparent film, the dicing alignment mark formed on the upper surface of the wafer 10 can be read through the protective tape 12, and it is therefore possible to accurately cut the wafer 10 into a desired shape. In this way, the wafer 10 having a plurality of liquid crystal driving elements is cut and separated to form a plurality of individual element arrays 16.

Fifth Step

Figure 1D:
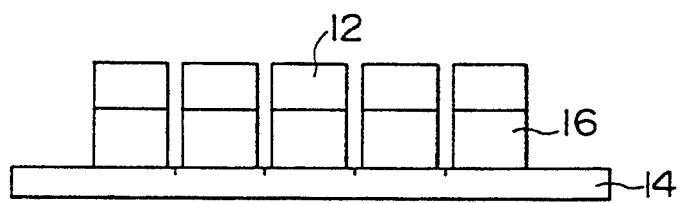

As shown in FIG. 1D, the supporting tape 14 is drawn as required. Then, the protective tape 12 is irradiated with ultraviolet rays in a quantity of about 300 to 500 mJ/cm² to harden the ultraviolet-setting adhesive layer of the protective tape 12, thereby reducing an adhesive strength of the ultraviolet-setting adhesive layer of the protective tape 12 with respect to the wafer 10. Then, the protective tape 12 is peeled from the upper surface of the wafer 10. The adhesive strength (peel strength) of the ultraviolet-setting adhesive layer of the protective tape 12 is about 500 to 1000 g/25 mm before the irradiation with ultraviolet rays, and it is reduced to about 20 to 30 g/25 mm after the irradiation with ultraviolet rays. Accordingly, the protective tape 12 can be easily peeled from the wafer 10 after the irradiation with ultraviolet rays. Further, in the case where the supporting tape 14 employs an ultraviolet-setting adhesive layer, it is irradiated with ultraviolet rays in a quantity of about 300 to 500 mJ/cm² to harden the ultraviolet-setting adhesive layer of the supporting tape 14, thereby reducing an adhesive strength of the ultraviolet-setting adhesive layer of the supporting tape 14 with respect to the wafer 10. Then, the supporting tape 14 is peeled from the wafer 10. The adhesive strength (peel strength) of the ultraviolet-setting adhesive layer of the supporting tape 14 is about 500 to 1000 g/25 mm before the irradiation of ultraviolet rays, and it is reduced to about 20 to 30 g/25 mm after the irradiation of ultraviolet rays. Accordingly, the supporting tape 14 can be easily peeled from the wafer 10.

Sixth Step

Then, an orientation film is formed on each element array, and rubbing of the orientation film is performed to complete a liquid crystal display device in accordance with a conventional manufacturing method for a liquid crystal display device.

The formation and the rubbing of the orientation film may be performed at the end of the first step. In this case, contaminant of several-microns level is attached to the orientation film in the rubbing process. However, upon peeling the protective tape 12 in the first step, the contaminant adhering to the adhesive layer of the protective tape 12 is removed from the element arrays 16. Accordingly, it is unnecessary to wash the element arrays 16 later, so as to remove the contaminant attached to the orientation film, thereby preventing deterioration of the orientation film due to the washing.

In the first step, a color filter may be formed on the substrate 20, and an ITO film may be then formed on the color filter by a sputtering process. Then, the ITO film may be patterned by a photolithography process and an etching process to form a plurality of opposing electrodes on the substrate 20. Thereafter, the second step to the sixth step may be similarly performed to manufacture a plurality of individual opposing electrode arrays.

Having thus described a specific preferred embodiment of the present invention, it is not limited to the above preferred embodiment. For example, while the liquid crystal display device mentioned above is of an active matrix type, it may be of a simple matrix type. Further, the method of the present invention may also be applied to the case of manufacturing individual semiconductor element arrays from a silicon wafer having various integrated circuits composed of a plurality of logic circuits and memory circuits, the case of manufacturing individual semiconductor laser element arrays or compound semiconductor element arrays from a wafer of GaAs or the like having semiconductor laser elements or compound semiconductor elements, and the case of manufacturing photodiodes, light emitting elements, CCD imagers, linear sensors, etc.

Although various minor changes and modifications might be proposed by those skilled in the art, it will be understood that I wish to include within the scope of the patent warranted hereon all such changes and modifications as reasonably come within my contribution to the art.

What is claimed is:

1. A method of manufacturing a plurality of individual element arrays, comprising the steps of:
   forming a wafer comprising a substrate and a plurality of active elements formed on said substrate at an upper surface thereof, indicia used to guide cutting during creation of the individual elements being provided at said upper surface;
   bonding a transparent protective tape to all areas of said upper surface of said wafer at which said active elements are exposed to protect said wafer and said active elements from dust created during cutting;
   bonding a supporting tape to a lower surface of said wafer to support said wafer;
   cutting said transparent protective tape, said wafer and an upper portion of said supporting tape to form said individual element arrays separated from each other, alignment Of said cutting being accomplished by viewing said indicia through said transparent protective layer; and
   peeling off said transparent protective tape and supporting tape from said individual element arrays.

2. The method as defined in claim 1, wherein said transparent protective tape has an adhesive strength smaller than that of said supporting tape.

3. The method as defined in claim 1, wherein said transparent protective tape comprises a transparent film and an ultraviolet-setting adhesive layer formed on said transparent film.

4. The method as defined in claim 3, further comprising the step of irradiating said transparent protective tape with ultraviolet rays after said cutting step to thereby harden said ultraviolet-setting adhesive layer of said transparent protective tape.

5. The method as defined in claim 4, further comprising the step of peeling said transparent protective tape from each of said element arrays after said irradiating step.

6. The method as defined in claim 3, wherein said supporting tape comprises a base film and an ultraviolet-setting adhesive layer formed on said base film.

7. The method as defined in claim 6, further comprising the step of irradiating said transparent protective tape and said supporting tape with ultraviolet rays after said cutting step to thereby harden said ultraviolet-setting adhesive layer of said transparent protective tape and said ultraviolet-setting adhesive layer of said supporting tape.

8. The method as defined in claim 7, further comprising the step of peeling said transparent protective tape and said supporting tape from each of said element arrays after said irradiating step.

9. The method as defined in claim 1, wherein each of said element arrays comprises a display element array comprising a switching element for driving a liquid crystal cell and a display electrode associated with said switching element.

10. The method as defined in claim 9, wherein said switching element comprises a thin film transistor.

11. The method as defined in claim 1, wherein each of said element arrays comprises a color filter array comprising an insulating substrate, a color filter formed on said insulating substrate, and a picture element electrode formed over said color filter.

12. The method as defined in claim 1, wherein each of said element arrays comprises an opposing electrode array comprising an insulating substrate and an opposing electrode formed on said insulating substrate.

13. The method as defined in claim 1, wherein a dicing alignment mark is formed on said upper surface of said wafer, further comprising the step of reading said dicing alignment mark through said transparent protective tape before said cutting step.

14. A method of manufacturing a plurality of individual element arrays, comprising the steps of:

forming a wafer comprising a substrate and a plurality of active elements formed on said substrate in an upper surface thereof, indicia used to guide cutting during creation of the individual elements being provided at said upper surface;

bonding a transparent protective tape having an ultraviolet settable-adhesive layer to all portions of said upper surface of said wafer at which active elements are exposed to protect said wafer and said active elements from dust created during cutting;

bonding a supporting tape having an ultraviolet-settable adhesive layer to a lower surface of said wafer to support said wafer, the ultraviolet-settable adhesive layer of the protective tape being harder than the ultraviolet-settable adhesive layer of the supporting tape so that the protective tape adhesive layer does not substantially penetrate into a film pattern of the active elements formed at the upper surface;

cutting said transparent protective tape, said wafer and an upper portion of said supporting tape to form said individual element arrays separated from each other, alignment of said cutting being accomplished by viewing said indicia through said transparent protective layer;

exposing said ultraviolet-settable adhesive layers of both said protective tape and said supporting tape to ultraviolet light to harden the same for easier removal; and peeling off the transparent protective tape and supporting tape.

15. A method of manufacturing a plurality of individual element arrays, comprising the steps of:

forming a wafer comprising a substrate and a plurality of active elements formed on said substrate at an upper surface thereof, indicia used to guide cutting during creation of the individual elements being provided at said upper surface;

bonding a transparent protective tape to all areas of said upper surface of said wafer at which said active elements are exposed to protect said wafer and said active elements from dust created during cutting, and wherein said transparent protective tape has an ultraviolet-settable adhesive layer;

bonding a supporting tape having an adhesive layer to a lower surface of said wafer to support said wafer, a hardness of the ultraviolet settable layer of the protective tape being greater than a hardness of the adhesive layer of said supporting tape;

cutting said transparent protective tape, said wafer and an upper portion of said supporting tape to form said individual element arrays separated from each other, alignment of said cutting being accomplished by viewing said indicia through said transparent protective layer;

exposing the ultraviolet-settable adhesive layer of said transparent protective tape to ultraviolet light to harden the same to permit easier removal; and peeling off the transparent protective tape and supporting tape.

* * * * *